(12) United States Patent
Huang

(10) Patent No.: US 6,614,602 B1
(45) Date of Patent: Sep. 2, 2003

(54) METHOD OF MANUFACTURING LENS CAP FOR TRANSISTOR OUTLINE PACKAGE

(75) Inventor: Nan Tsung Huang, Tu-Chen (TW)

(73) Assignee: Light Sources, Inc., Orange, CT (US)

( * ) Notice: Subject to any disclaimer, the term of this patent is extended or adjusted under 35 U.S.C. 154(b) by 0 days.

(21) Appl. No.: 10/150,359

(22) Filed: May 17, 2002

(30) Foreign Application Priority Data

Apr. 18, 2002 (TW) .......................................... 91107986

(51) Int. Cl.[7] .................................................. G02B 7/02
(52) U.S. Cl. ....................... 359/811; 359/900; 351/177; 351/168
(58) Field of Search ................................ 359/811, 812, 359/813, 642, 900, 721, 719; 451/42, 43; 351/159, 177, 168, 161; 264/1.8, 1.7

(56) References Cited

U.S. PATENT DOCUMENTS

| | | | | |
|---|---|---|---|---|
| 3,948,007 A | * | 4/1976 | Feneberg et al. | ............. 451/42 |
| 4,943,150 A | * | 7/1990 | Deichert et al. | ............. 351/177 |
| 5,976,425 A | * | 11/1999 | Nomura et al. | ............... 264/2.2 |
| 6,010,647 A | * | 1/2000 | Nomura et al. | ............... 264/1.8 |
| 6,158,861 A | * | 12/2000 | Oyama et al. | ........... 351/160 R |
| 6,347,870 B1 | * | 2/2002 | LaRuffa | ........................ 351/177 |
| 6,409,398 B2 | * | 6/2002 | Nakaya et al. | ................. 385/93 |
| 6,467,904 B1 | * | 10/2002 | Gartley et al. | .............. 351/177 |

* cited by examiner

Primary Examiner—Mohammad Sikder
(74) Attorney, Agent, or Firm—Robert A. Seemann

(57) ABSTRACT

A method of manufacturing a lens cap (40) for a transistor outline package includes the steps of: (a) providing a main part (2) of the lens cap; (b) providing an upper and lower molds (51, 52) and putting the main part into the molds; (c) closing the molds and insert molding a lens part (3). The product lens cap includes the lens part and the hollow main part, which is adapted for receiving optoelectronic components. The formed lens part includes a ball lens (30) and a sprue filling portion (31). The main part defines an opening (23), which includes a ball lens receiving hole (231) and a sprue (232). During the insert molding part of the process, the melted lens part material is injected through an injection hole (53) into the sprue, and then flows into the ball lens receiving hole, assuring good optical quality of the ball lens.

2 Claims, 3 Drawing Sheets

METHOD OF MANUFACTURING LENS CAP FOR TRANSISTOR OUTLINE PACKAGE

FIELD OF THE INVENTION

The present invention generally relates to a method of manufacturing lens caps for transistor outline packages adapted to package optoelectronic components, and particularly to a method of manufacturing ball lens caps for said transistor outline packages. The cross-referenced copending application with an unknown serial number filed on May 9, 2002, titled "LENS CAP FOR TRANSISTOR OUTLINE PACKAGE", discloses the article made from the method disclosed in this application.

BACKGROUND OF THE INVENTION

Optoelectronic components, such as optical coupling devices, generally require a lens cap to protect them from damage and from EMI (Electro Magnetic Interference). Without such protection, damage can result from exposure to moisture, dirt, heat, radiation, or other hazards. The lens cap generally comprises a main part and a lens part. The lens part is usually coupled to the main part by a method including gluing, as disclosed in Japanese Application 2-165684. However, problems with this method include contamination of the lens part due to dispersion of the glue, which can affect the optical characteristics of the lens part. In addition, there is a danger that the lens part will become separated from the main part of the housing if the glue loses effectiveness over time. Furthermore, the method of manufacturing the lens cap is unduly costly and time-consuming.

Therefore, an improved method of manufacturing a lens cap for a transistor outline package that overcomes the above-mentioned disadvantages is desired.

SUMMARY OF THE INVENTION

A main object of the present invention is to provide a method of manufacturing a lens cap for a transistor outline package which produces a lens cap that holds up over time and whose optical characteristics are reliably good.

Another object of the present invention is to provide a method of manufacturing cheap lens caps for transistor outline packages in large quantity.

To achieve the above objects, a method of manufacturing lens caps for transistor outline packages is provided by the present invention. The manufactured lens cap comprises a lens part and a hollow main part adapted for receiving optoelectronic components. The lens part includes a ball lens having a first groove and a sprue filling portion having a second groove. The main part defines an opening which comprises a ball lens receiving hole communicating with a sprue. A sidestep is formed along an edge of the opening protruding into the sprue. Said method comprises: (a) providing the main part of the lens cap; (b) providing upper and lower molds and putting the main part into the molds; (c) closing the molds and insert molding the lens part. The ball lens has a diameter greater than the ball lens receiving hole. The lens part formed by this method is thus firmly coupled to the main part of the lens cap through the engagement of the protruding sidestep with the second groove and a circular rim of the main part with the first groove.

Other objects, advantages and novel features of the invention will become more apparent from the following detailed description of a preferred embodiment thereof when taken in conjunction with the accompanying drawings, wherein:

DETAILED DESCRIPTION OF THE INVENTION

Figure 1:
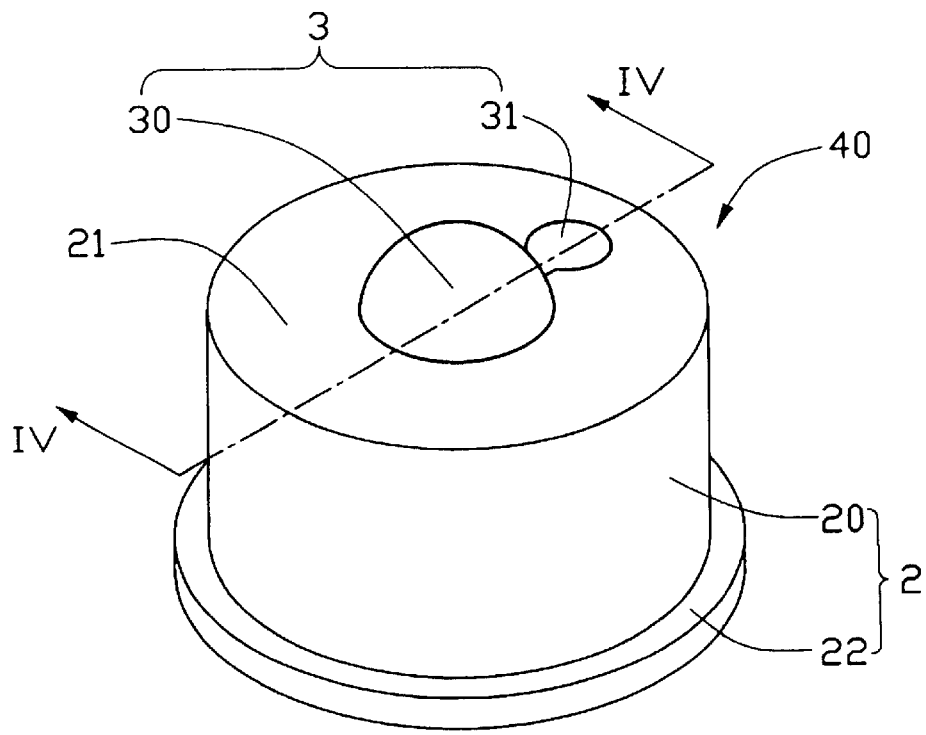
FIG. 1 is a perspective view of a lens cap for a transistor outline package made by a method in accordance with a preferred embodiment of the present invention.

Referring now to the drawings in detail, FIG. 1 shows a ball lens cap 40 made by a method in accordance with a preferred embodiment of the present invention. The ball lens cap 40 comprises a transparent lens part 3 and a hollow main part 2 adapted for receiving optoelectronic components (not shown) therein. The lens part 3 can be made of a plastic or other suitable transparent material and the main part 2 can be made of a metallic or other suitable conductive material. The lens part 3 comprises a sprue filling portion 31 and a ball lens 30. The main part 2 has a cylindrical trunk portion 20 with a top panel 21 and an annular edge 22 extending from a lower extremity of the trunk portion 20. The annular edge 22 is suitable for soldering to a base plate (not shown). The base plate (not shown) and the ball lens cap 40 constitute a transistor outline package.

Figure 2:
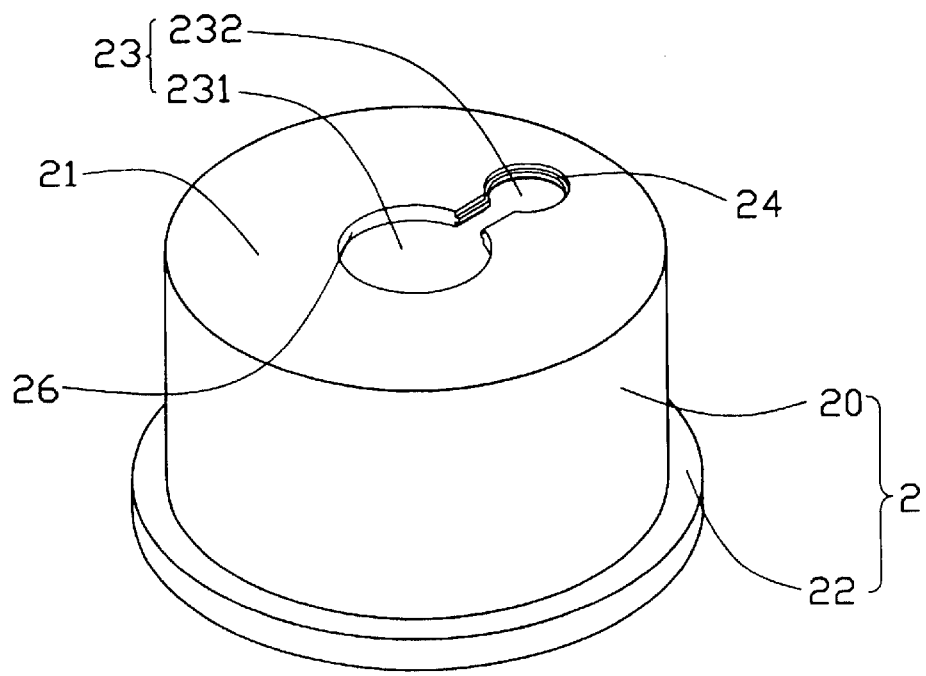
FIG. 2 is a perspective view of the lens cap of FIG. 1 without a lens part.
Figure 3:
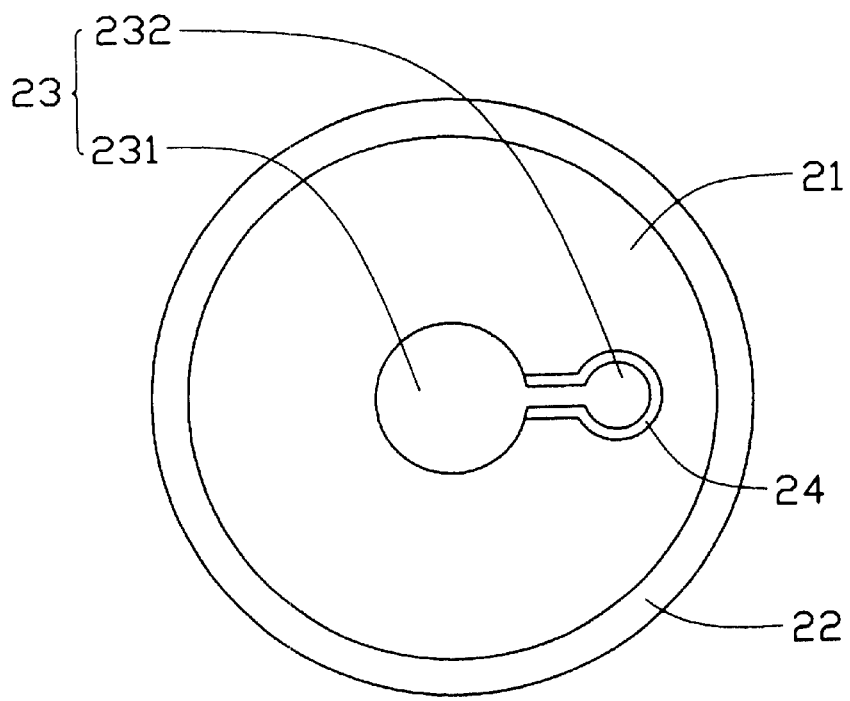
FIG. 3 is a top view of FIG. 2.
Figure 4:
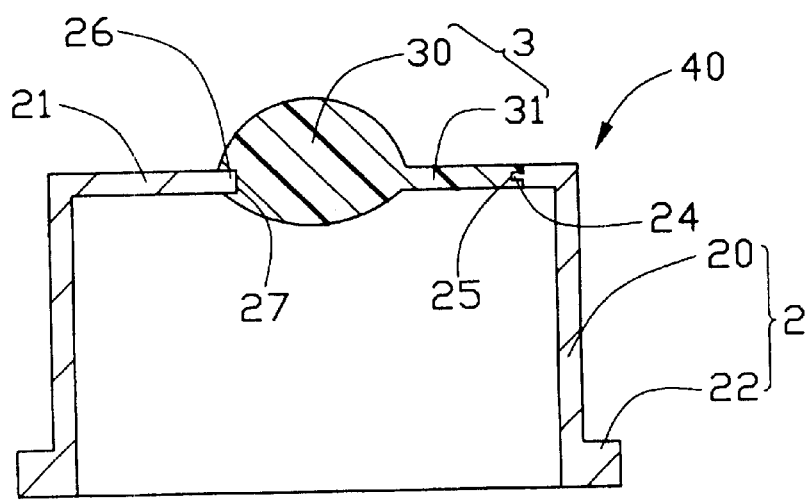
FIG. 4 is a cross-sectional view taken along line IV—IV of FIG. 1.

Now referring to FIGS. 2–4, The trunk portion 20 defines an opening 23 in the top panel 21. The opening 23 comprises a ball lens receiving hole 231 and a sprue 232. A sidestep 24 is formed along an edge of the opening 23 protruding into the sprue 232. The lens part 3 has a first groove 27 around an outer surface of the ball lens 30 and a second groove 25 around an outer surface of the sprue filling portion 31 corresponding to the protruding sidestep 24. The second groove 25 and the first groove 27 are linked together at a boundary between the sprue filling portion 31 and the ball lens 30.

The ball lens 30 has a diameter greater than the ball lens receiving hole 231. The lens part 3 is firmly coupled to the main part 2 of the ball lens cap 40 through the engagement of the first and second grooves 27, 25 with a circular rim 26 around the ball lens receiving hole 231 and the protruding sidestep 24, respectively.

Figure 5:
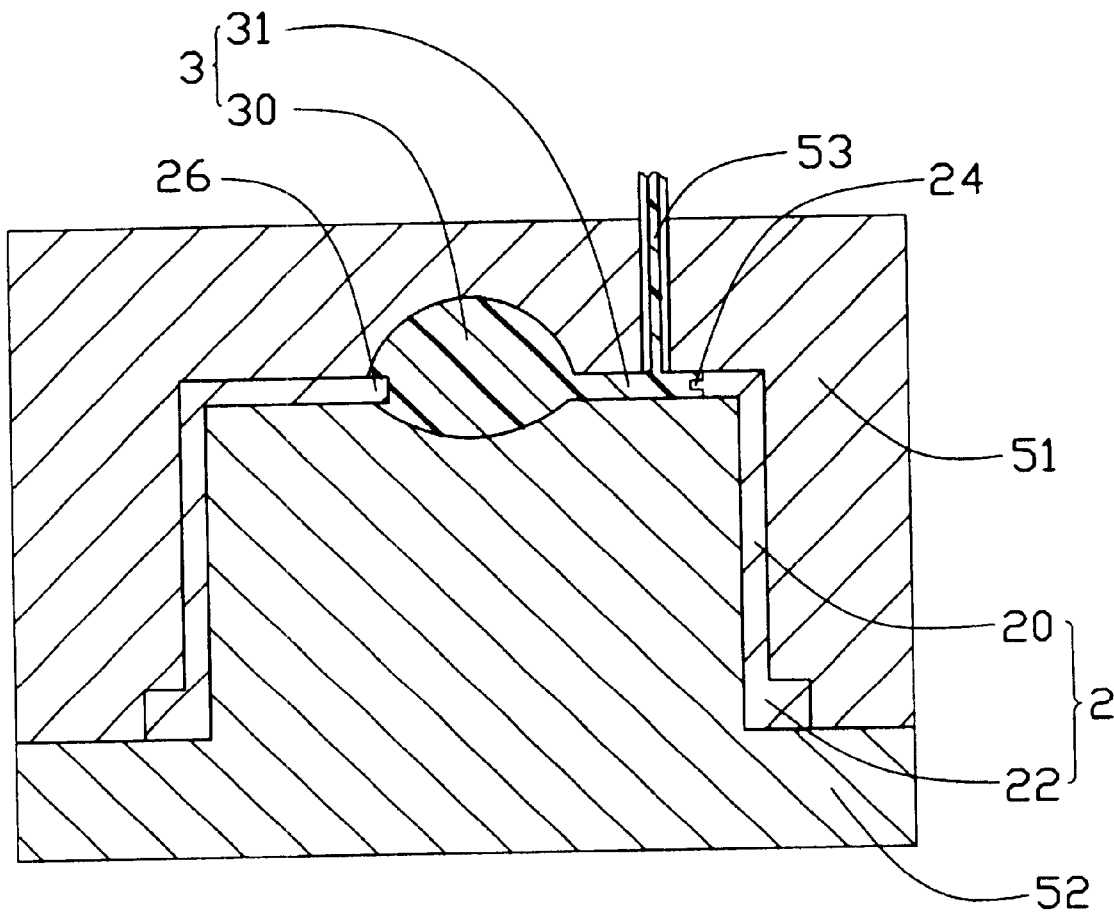
FIG. 5 is a cross-sectional side view of the lens cap of FIG. 1 between a pair of mold halves during insert molding of the lens part.

Referring to FIG. 5, the process of manufacturing the ball lens cap 40 of the present invention comprises the following steps: (1) providing the main part 2 of the ball lens cap 40; (2) providing an upper and a lower molds 51 and 52 and putting the main part 2 into the molds 51, 52; (3) closing the molds 51, 52 and insert molding the lens part 3. In step (3), melted material of the lens part 3 is injected into the molds 51, 52 through an injection hole 53 and first enters into the sprue 232, and then enters into the ball lens receiving hole 231 to form the sprue filling portion 31 and the ball lens 30. In the present invention, the existence of the sprue 232 ensures that the formed ball lens 30 will have good optical characteristics because the optical characteristics of an insert molding near the injecting hole 53 are generally inferior, and the sprue 232 allows the injecting hole 53 to be placed at a distance from the ball lens 30.

It is understood that the invention may be embodied in other forms without departing from the spirit thereof. Thus, the present embodiment is to be considered in all respects as illustrative and not restrictive, and the invention is not to be limited to the details given herein.

What is claimed is:

1. A method for making a lens cap comprising steps of:

providing a main part defining a plate with an opening extending therethrough in a vertical direction, said opening including a lens receiving hole and a sprue communicatively side by side arranged with each other;

insert-molding said main part with melted material of an optical lens via said sprue in a non-horizontal direction to form the lens located in said lens receiving hole and extending beyond at least one of two opposite surfaces of said plate in said vertical direction.

2. The method as claimed in claim 1, wherein the finalized lens cap includes a sprue filling portion embedded with said sprue without extending beyond said plate in said vertical direction.

* * * * *